United States Patent
Henry et al.

(10) Patent No.: US 10,939,298 B2
(45) Date of Patent: Mar. 2, 2021

(54) APPLICATION ACCESS BASED ON NETWORK

(71) Applicant: Hewlett-Packard Development Company, L.P., Spring, TX (US)

(72) Inventors: Shaun Henry, Boise, ID (US); Gerold Keith Shelton, Boise, ID (US); Gregory Doyle Creager, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/655,772

(22) Filed: Oct. 17, 2019

(65) Prior Publication Data

US 2020/0053630 A1 Feb. 13, 2020

Related U.S. Application Data

(63) Continuation of application No. 15/542,819, filed as application No. PCT/US2015/023714 on Mar. 31, 2015, now Pat. No. 10,492,121.

(51) Int. Cl.
| | |
|---|---|
| *H04W 12/08* | (2009.01) |
| *H04W 4/50* | (2018.01) |
| *H04W 4/021* | (2018.01) |
| *G06F 21/60* | (2013.01) |
| *H04W 48/02* | (2009.01) |
| *H04W 88/06* | (2009.01) |

(52) U.S. Cl.
CPC .......... *H04W 12/08* (2013.01); *G06F 21/604* (2013.01); *H04W 4/021* (2013.01); *H04W 4/50* (2018.02); *H04W 48/02* (2013.01); *H04W 88/06* (2013.01)

(58) Field of Classification Search
CPC combination set(s) only.
See application file for complete search history.

(56) References Cited

U.S. PATENT DOCUMENTS

| | | |
|---|---|---|
| 6,701,144 B2 | 3/2004 | Kirbas et al. |
| 7,743,407 B2 | 6/2010 | Sprigg |
| 7,769,394 B1 | 8/2010 | Zhu |
| 8,204,536 B2 | 6/2012 | Franklin et al. |
| 8,554,179 B2 | 10/2013 | Pecen et al. |
| 8,886,933 B1 | 11/2014 | Poiesz et al. |
| 2008/0305766 A1 | 12/2008 | Falk |
| 2010/0248719 A1 | 9/2010 | Scholaert |
| 2011/0065417 A1* | 3/2011 | McDonald ........ H04W 12/0027 455/410 |

(Continued)

OTHER PUBLICATIONS

"Review of Apps That Use Network Information"; Apr. 3, 2014; 31 pages.

*Primary Examiner* — Kyaw Z Soe
(74) *Attorney, Agent, or Firm* — HPI Patent Department

(57) ABSTRACT

Example implementations relate to application access based on a network. For example, a computing device may include a processor. The processor may detect that the computing device is connected to a particular network and may identify an identifier associated with the particular network. The processor may access settings indicating a subset of applications associated with the identifier of the particular network, where the subset of applications is part of a set of applications available on the computing device. The processor may restrict access to the subset of applications based on the settings.

15 Claims, 5 Drawing Sheets

(56) References Cited

U.S. PATENT DOCUMENTS

| | | |
|---|---|---|
| 2013/0132578 A1 | 5/2013 | Raleigh |
| 2014/0025796 A1* | 1/2014 | Vibhor ................... H04L 41/12 709/222 |
| 2014/0273972 A1 | 9/2014 | Butler et al. |
| 2015/0020148 A1 | 1/2015 | Greenbaum |
| 2015/0163067 A1* | 6/2015 | Cudak ................... H04W 4/21 709/204 |
| 2015/0180884 A1 | 6/2015 | Masahiko |

* cited by examiner

APPLICATION ACCESS BASED ON NETWORK

PRIORITY APPLICATION INFORMATION

This application is a continuation of U.S. National Stage Application Ser. No. 15/542,819 filed on Jul. 11, 2017, which claims priority to International Application No. PCT/US2015/023714 filed on Mar. 31, 2015. The contents of which are incorporated herein by reference in its entirety.

BACKGROUND

A computing device may access various types of applications available on the computing device, where each application may provide particular features and functionalities. For example, a computing device may access an email application that provides access to an email account associated with the email application or a weather application that provides a forecast of the weather.

BRIEF DESCRIPTION OF THE DRAWINGS

Some examples of the present application are described with respect to the following figures.

DETAILED DESCRIPTION

Figure 1:
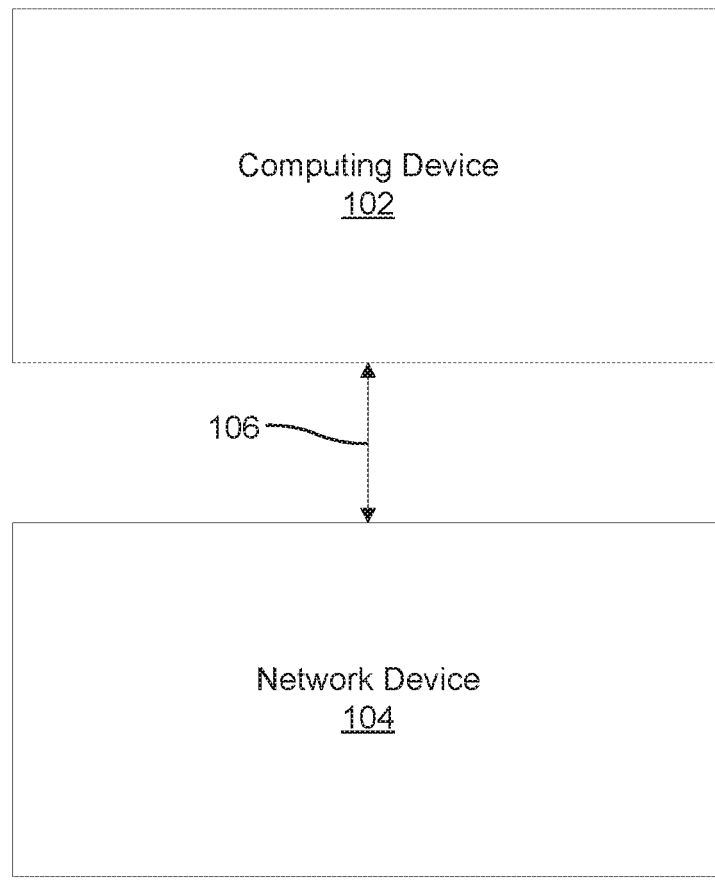
FIG. 1 is a block diagram of an example system for accessing an application based on a network.

As described above, a computing device may access various types of applications available on the computing device. However, if the computing device is connected to a particular network, a user may wish to restrict access to certain applications for various reasons relating to that network. For example, if a user is in a coffee shop and connected to the coffee shop's public network, the user may wish to disable access to the user's email application due to security concerns relating to the public network. In another example, a user may wish to restrict access to certain applications on a computing device that a child may use on a public network (e.g., restricting access to a web browser application and/or a camera application when the computing device is connected to a public network), while those applications may be made available on a home network (e.g., a web browser application may be allowed on a home network that filters content).

To provide access to applications more securely, access to certain applications available on a computing device may be restricted based on the network to which the computing device is connected. For example, when a computing device connects to a particular Wi-Fi network and is authenticated, an identifier associated with the Wi-Fi network may be used to configure the applications on the computing device such that only selected applications may be made available based on the network connection. For example, a user may provide settings that specify that certain applications may be accessed on the computing device when the computing device is connected to a particular network. The settings may be specific to the computing device on which the settings were specified such that each computing device connected to a particular network may access different subsets of applications based on the settings. For example, a first computing device may specify settings allowing access to only a particular subset of applications, and a second computing device may specify settings allowing access to a different subset of applications. Settings may be specified for any suitable network, such as networks currently being accessed, networks previously accessed, networks potentially accessed in the future, guest networks or unspecified networks, and the like. In some examples, networks for which settings have not yet been provided may have default settings, which may be any suitable settings (e.g., all applications enabled, all applications disabled, a certain subset of applications disabled, etc.).

The security features associated with these settings may be implemented in any suitable manner. For example, they may be implemented as a software package installable as an application or may be part of the operating system of a device. In some examples, when the software is opened by a computing device for the first time, the software may query the Network Support Database to pull known identifiers, such as service set identifications (SSIDs) for networks currently or previously accessed by the computing device. Secondary openings of the software may check for new SSIDs and/or bypass this functionality, allowing the user to manually request a check for networks. In some examples, the security features may allow the user to manually input a particular SSID to which they may connect in the future for the purpose of configuring which applications are to be restricted when the computing device is connected to a network associated with that particular SSID. In some examples, the applications to be restricted (or authorized) for a given network may be dragged and dropped into a particular network SSID bucket. For example, any applications which are to be restricted (or allowed) for a particular network may be dragged and dropped onto an SSID label for that particular network. In some examples, if an application is restricted but a user wishes to access the application, at the application start, a password override may be enabled such that the application may be made available if the correct password is given.

A computing device connected to a particular network may restrict access to certain applications based on settings associated with that particular network. For example, the computing device may detect that it is connected to a particular network and identify an identifier associated with the particular network. The computing device may access settings indicating a subset of applications associated with the identifier of the particular network, where the subset of applications may be part of a set of applications available on the computing device. The computing device may restrict access to the subset of applications based on the settings. In some examples, the computing device may detect that it is connect to a different network than the particular network and may restrict access to a different subset of applications based on settings associated with the different network. In some examples, the computing device may detect that it is not connected to any network and may allow access to the entire set of applications available on the computing device.

Referring now to the figures, FIG. 1 is a block diagram of an example system 100 for accessing an application based on a network. System 100 may include computing device 102, which may be any suitable computing device, such as a notebook computer, a desktop computer, an all-in-one system, a tablet computing device, a mobile phone, a smart phone, an electronic book reader, a printing device, or any other electronic device suitable for accessing applications available on computing device 102 based on a network. Computing device 102 may be in communication with network device 104, which may be any suitable network device capable of providing computing device 102 with access to a particular network, such as a modem, a router, or any other electronic device suitable for providing computing device 102 with access to a particular network. The network that may be accessed via network device 104 may be any suitable network, such as an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or any other type of network, or a combination of two or more such networks. Computing device 102 and network device 104 may be in communication with each other via connection 106, which may be any suitable connection such as a wired connection, a wireless connection (e.g., Wi-Fi), an electrical connection, and the like.

Computing device 102 may be any suitable computing device that may allow access to applications on available on computing device 102 based on the network to which computing device 102 is connected. For example, computing device 102 may detect that it is connected to a particular network (e.g., via network device 104) and may identify an identifier associated with that particular network. The identifier may be any suitable identifier that may be used to identify the associated network, such as a SSID. Computing device 102, which may have a set of applications available on computing device 102, may access settings indicating a subset of the applications that are associated with the identifier of the particular network. Computing device 102 may restrict access to the subset of applications based on the settings.

In some examples, while access is restricted to a subset of applications, the subset of applications may still be capable of receiving updates to the applications. For example, access to the applications may be blocked but may still be operating in the background such that updates (e.g., new emails, notifications, software updates associated with the applications, etc.) may be received. In some examples, the execution of the subset of applications may be blocked based on the settings. In some examples, while access is restricted to a subset of applications, the subset of applications may not receive any updates and/or may not be executed.

Figure 2:
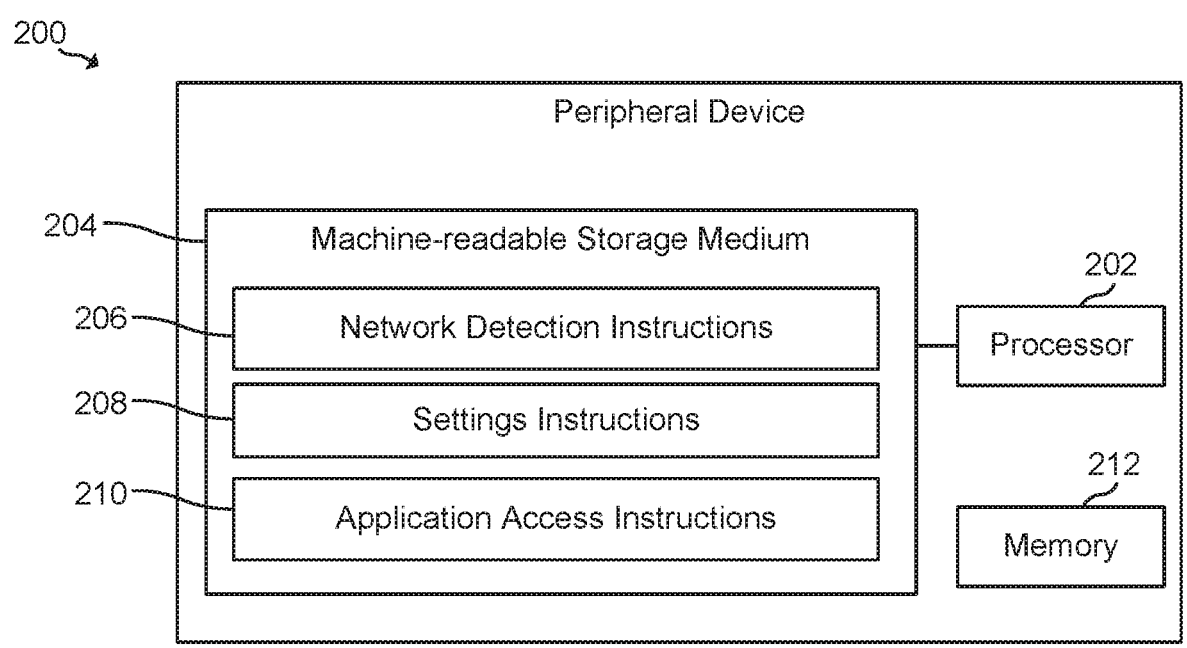
FIG. 2 is a block diagram of an example computing device for accessing an application based on a network.

FIG. 2 is a block diagram of an example computing device 200 for accessing an application based on a network. Computing device 200 may be any suitable computing device (e.g., computing device 102 of FIG. 1) that may restrict access to a subset of applications available on computing device 200 based on settings associated with a network to which computing device 200 is connected.

Computing device 200 may be, for example, a web-based server, a local area network server, a cloud-based server, a notebook computer, a desktop computer, an all-in-one system, a tablet computing device, a mobile phone, an electronic book reader, a printing device, or any other electronic device suitable for accessing an application based on a network to which computing device 200 is connected. Computing device 200 may include a processor 202 and a machine-readable storage medium 204. Computing device 200 may detect that it is connected to a particular network, access settings associated with that network, and restrict access to a subset of applications available on computing device 200 based on the settings.

Processor 202 is a tangible hardware component that may be a central processing unit (CPU), a semiconductor-based microprocessor, and/or other hardware devices suitable for retrieval and execution of instructions stored in machine-readable storage medium 204. Processor 202 may fetch, decode, and execute instructions 206, 208, and 210 to control a process of accessing an application based on a network to which computing device 200 is connected. As an alternative or in addition to retrieving and executing instructions, processor 202 may include at least one electronic circuit that includes electronic components for performing the functionality of instructions 206, 208, 210, or a combination thereof.

Machine-readable storage medium 204 may be any electronic, magnetic, optical, or other physical storage device that contains or stores executable instructions. Thus, machine-readable storage medium 204 may be, for example, Random Access Memory (RAM), an EPROM, an Electrically Erasable Programmable Read-Only Memory (EEPROM), a storage device, an optical disc, and the like. In some examples, machine-readable storage medium 204 may be a non-transitory storage medium, where the term "non-transitory" does not encompass transitory propagating signals. As described in detail below, machine-readable storage medium 204 may be encoded with a series of processor executable instructions 206, 208, and 210 for detecting that computing device 200 is connected to a particular network; determining an identifier associated with the particular network; accessing settings associated with the identifier, identifying a subset of applications specified by the settings, the subset of applications being part of a set of applications available on computing device 200; and restricting access to the subset of applications while computing device 200 is connected to the particular network.

Network detection instructions 206 may manage and control the detection of a particular network to which computing device 200 is connected, including determining an identifier associated with the particular network to which computing device 200 is connected. For example, when computing device 200 connects to a network, network detection instructions 206 may detect the connection and the SSID associated with the network. Network detection instructions 206 may also determine when computing device 200 is not connected to any networks and/or when computing device 200 switches its connection to a different network.

Settings instructions 208 may manage and control accessing settings associated with an identifier of a network to which computing device 200 is connected and identifying a subset of applications specified by those settings. The settings may be accessed from memory 212, which may be any suitable memory capable of storing settings specifying which applications are to be blocked and/or accessed based on connections to various networks. Settings instructions 208 may determine the appropriate settings associated with the particular network to which computing device 200 is connected and use those settings to determine the subset of applications that are to be blocked while computing device 200 is connected to that network.

Application access instructions 210 may manage and control the restriction of access to a subset of applications based on the settings. For example, application access instructions 210 may restrict access to the specified subset of applications while computing device 200 is connected to the associated network.

Figure 3:
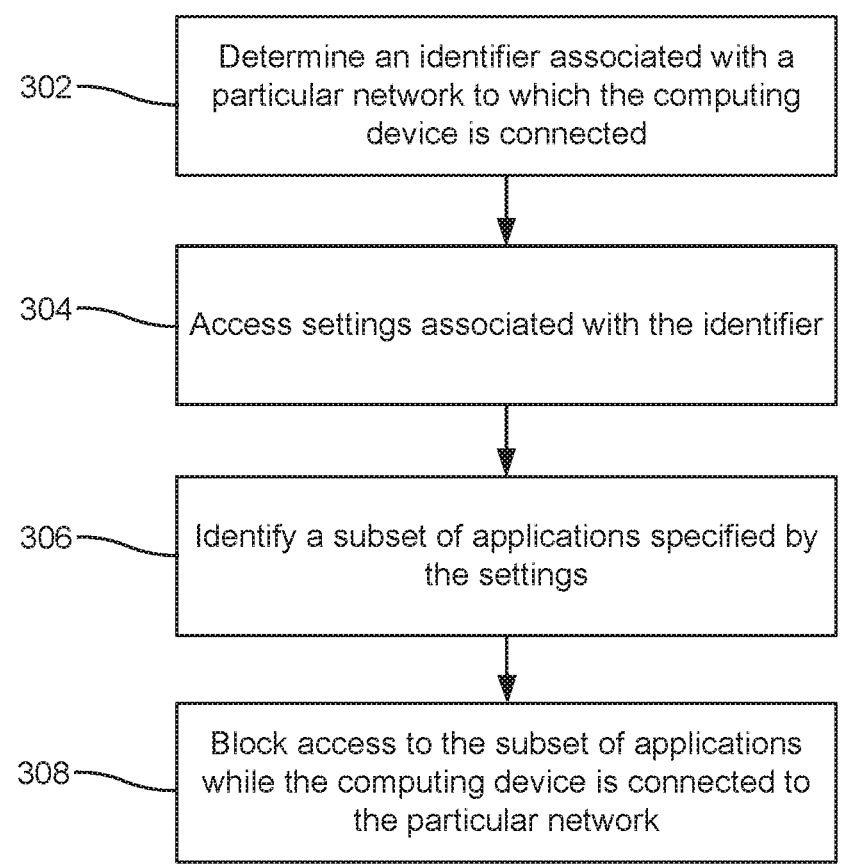
FIG. 3 is a flowchart of an example method for accessing an application based on a network.

FIG. 3 is a flowchart of an example method 300 for accessing an application based on a network. Method 300 may be implemented using computing device 102 of FIG. 1 and/or computing device 200 of FIG. 2.

Method 300 includes, at 302, determining an identifier associated with a particular network to which the computing device is connected. For example, when the computing device is connected to a particular network, the identifier (e.g., SSID) associated with the network may be determined.

Method 300 also includes, at 304, accessing settings associated with the identifier. For example, the settings may be accessed from a memory storing settings associated with various networks, where the settings specify to which applications to allow access based on the network connection.

Method 300 also includes, at 306, identifying a subset of applications specified by the settings. The subset of applications may be part of a set of applications available on the computing device, and the subset may be specified by the settings associated with the corresponding network to which the computing device is connected.

Method 300 also includes, at 308, blocking access to the subset of applications while the computing device is connected to the particular network. The subset of applications may be blocked in any suitable manner. For example, access to the subset of applications may be blocked by preventing the applications from being executed. In some examples, the subset of applications may each be capable of receiving updates even though access to the applications is blocked. In some examples, the subset of applications may be locked (e.g., by a password). The applications that are not blocked may be enabled and accessed by a user of the computing device.

Figure 4:
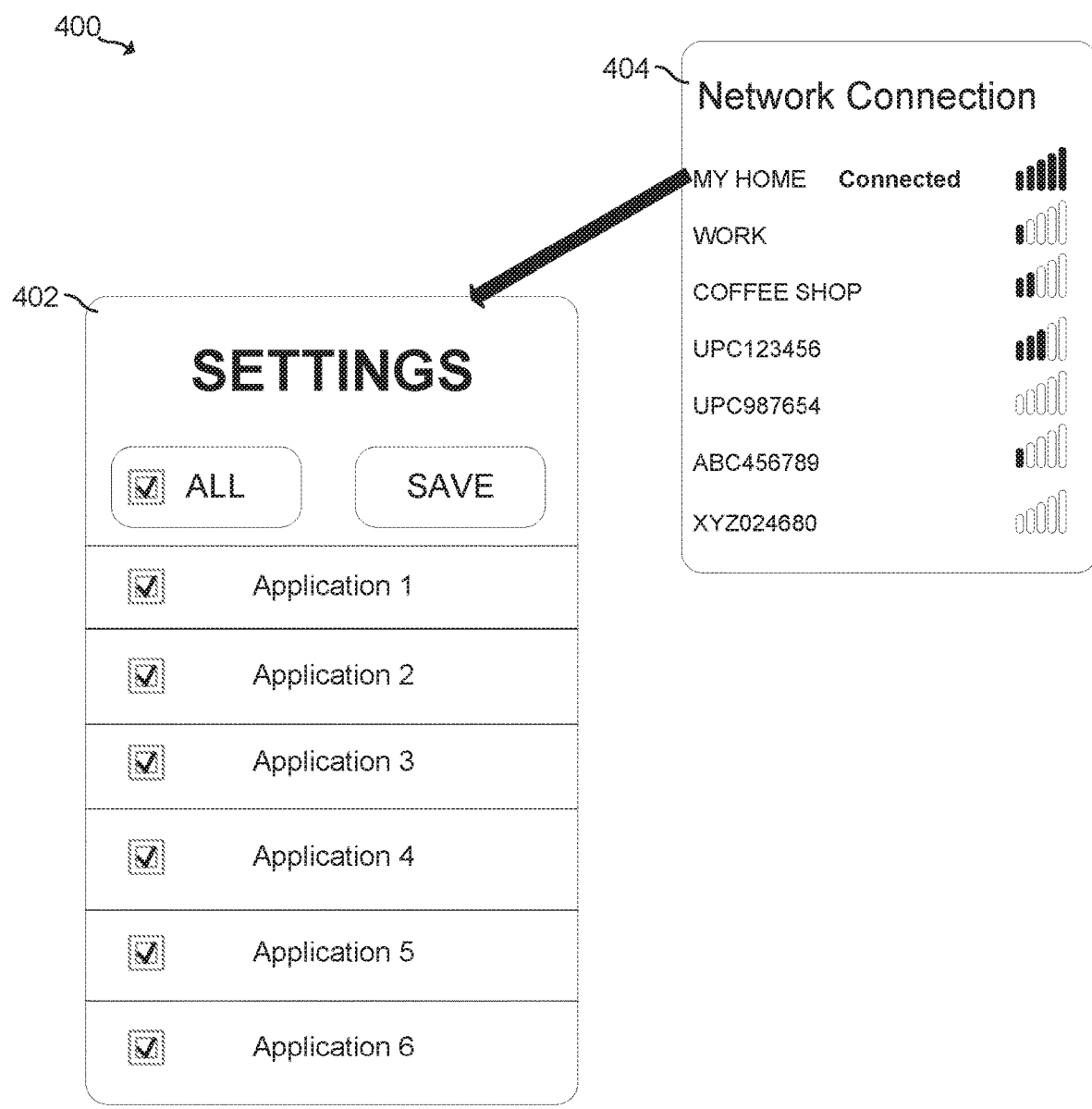
FIG. 4 is an interface diagram showing example user interfaces associated with accessing an application based on a network.

FIG. 4 is an interface diagram showing example user interfaces 400 associated with accessing an application based on a network. The example user interfaces 400 may include settings interface 402, which is an interface that may display settings associated with a particular network, and may also include a network connection interface 404, which is an interface that may display various networks that may be available and/or that may have been previously accessed. For example, when a computing device (e.g., computing device 102 of FIG. 1 and/or computing device 200 of FIG. 2) is connected to a network with the SSID "MY HOME," settings specified in settings interface 402 may be used to determine to which applications to block access. As shown in settings interface 402, all applications may be accessed when a computing device is connected to the "MY HOME" network. Additionally, settings associated with other networks may be specified, such as networks currently available and/or networks previously accessed. For example, settings associated with the "WORK" network may be specified to indicate to which applications to allow and/or restrict access, where the settings may be accessed by right-clicking the network identifier "WORK" in network connection interface 404. The settings may be specified in any suitable manner. For example, a user of a computing device may specify the settings for various networks and/or SSIDs by providing a user input to specify the settings (e.g., by checking the appropriate boxes in settings interface 402), and/or the settings may be specified automatically. In some examples, the check boxes shown in settings user interface 402 may be pre-populated as authorized, and the user may uncheck which application to restrict for a given network. In some examples, the settings interface 402 may be accessed after a user attempting to access the settings interface 402 is authenticated (e.g., after the user provides the correct password used to access settings interface 402).

Figure 5:
FIG. 5 is a block diagram showing example applications accessible based on an associated network.
Figure 5:
Figure 5:

FIG. 5 is a block diagram showing example applications 500 accessible based on an associated network. For example, when a computing device is connected to a network with the SSID "WORK," the settings may specify that the computing device may only be allowed to access Application 1, Application 3, Application 4, and Application 5, while access to other applications may be restricted. When the computing device is connected to a network with the SSID "COFFEE SHOP," the settings may specify that the computing device may only be allowed to access Application 1 and Application 4, while access to other applications may be restricted. When the computing device is connected to a network with the SSID "UPC123456," the settings may specify that the computing device may only be allowed to access Applications 1-5, while access to other applications may be restricted.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device, comprising:
an interface to display a plurality of networks on the computing device;
a processor coupled to the interface, the processor to:
display on the interface, a plurality of applications for a particular network of the plurality of networks, wherein the displayed plurality of applications are available to the computing device when the computing device is connected to the particular network;
deselect a subset of the plurality of applications for the particular network, wherein the deselected subset of applications are restricted from use when the computing device is connected to the particular network; and
receive updates to the deselected subset of applications when the access to the deselected subset of applications is restricted.

2. The computing device of claim 1, further comprising a settings interface to display settings associated with the plurality of networks.

3. The computing device of claim 2, wherein the settings interface is accessible responsive to an authentication of a user.

4. The computing device of claim 3, wherein the authentication is a password provided to the settings interface and authenticated by the processor of the computing device.

5. The computing device of claim 1, further comprising a network connection interface to display the plurality of networks.

6. The computing device of claim 5, wherein the network connection interface is to display a subset of the plurality of networks that are currently available to the computing device.

7. The computing device of claim 5, wherein the network connection interface is to display a subset of the plurality of networks that have been previously accessed by the computing device.

8. The computing device of claim 1, wherein the plurality of networks includes an identifier specific to each network.

9. The computing device of claim 8, wherein the plurality of applications displayed on the interface are based on pre-populated settings corresponding to the identifier.

10. A computing system, comprising:
an interface to display applications corresponding to a plurality of networks; and
a processor coupled to the interface, the processor to:
detect that the computing device is connected to a particular network of the plurality of networks;
access the interface to display a subset of applications associated with the particular network, wherein the interface specifies that the subset of applications is associated with a network previously accessed by the computing device;
restrict access to the subset of applications based on the settings associated with the network previously accessed by the computing device; and
receive updates to the subset of applications when the access to the subset of applications is restricted.

11. The computing system of claim 10, wherein the subset of applications are locked by a password responsive to being restricted.

12. The computing system of claim 10, wherein the displayed subset of applications associated with the particular network are deselected, via input to the interface, to restrict access to the subset of applications.

13. A non-transitory machine-readable storage medium storing instructions that, when executed by at least one processor of a computing device, cause the computing device to:
display an interface to display applications corresponding to a plurality of networks;
detect that the computing device is connected to a particular network of the plurality of networks;
access the interface indicating a subset of applications associated with the particular network, wherein the interface specifies the subset of applications associated with a network previously accessed by the computing device;
restrict access to the subset of applications based on the settings associated with the network previously accessed by the computing device; and
receive updates to the subset of applications when the access to the subset of applications is restricted.

14. The non-transitory machine-readable storage medium of claim 13, wherein the instructions further cause the computing device to:
determine via the interface, an identifier associated with the particular network and an identifier associated with the network previously accessed by the computing device; and
restrict access to the subset of applications based in part on the determined identifier of the particular network and the determined identifier of the network previously accessed by the computing device.

15. The non-transitory machine-readable storage medium of claim 13, wherein:
the particular network is publicly accessible by other computing devices; and
the subset of applications are pre-populated to be accessible when the computing device is connected to the network previously accessed by the computing device.

* * * * *